United States Patent
Lee et al.

(10) Patent No.: US 10,321,458 B2
(45) Date of Patent: Jun. 11, 2019

(54) METHOD FOR ALLOCATING FREQUENCY RESOURCES IN WIRELESS COMMUNICATION SYSTEM, AND APPARATUS USING THE SAME

(71) Applicant: LG ELECTRONICS INC., Seoul (KR)

(72) Inventors: Sangrim Lee, Seoul (KR); Hyunsoo Ko, Seoul (KR); Kukheon Choi, Seoul (KR); Kwangseok Noh, Seoul (KR); Dongkyu Kim, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,686

(22) PCT Filed: Sep. 24, 2015

(86) PCT No.: PCT/KR2015/010077
§ 371 (c)(1),
(2) Date: Oct. 19, 2017

(87) PCT Pub. No.: WO2016/182136
PCT Pub. Date: Nov. 17, 2016

(65) Prior Publication Data
US 2018/0110051 A1   Apr. 19, 2018

Related U.S. Application Data

(60) Provisional application No. 62/158,544, filed on May 8, 2015.

(51) Int. Cl.
*H04B 7/00*  (2006.01)
*H04W 72/04*  (2009.01)
(Continued)

(52) U.S. Cl.
CPC ....... *H04W 72/0453* (2013.01); *H04L 5/0007* (2013.01); *H04L 5/0037* (2013.01);
(Continued)

(58) Field of Classification Search
CPC ...... H04W 28/16; H04W 28/20; H04W 28/26
(Continued)

(56) References Cited

U.S. PATENT DOCUMENTS 5,818,813 A * 10/1998 Saito ..................... H04L 5/0048
                                              370/208
7,532,565 B2 * 5/2009 Batra ................... H04L 27/2605
                                              370/208
(Continued)

FOREIGN PATENT DOCUMENTS

| EP | 2835926 A1 | 2/2015 |
| EP | 2840749 A1 | 2/2015 |
| WO | WO 2014/123926 A1 | 8/2014 |

OTHER PUBLICATIONS

Bai, Scheduling and resource allocation in OFDM and FBMC systems, 2010, IEEE, pp. 1042-1050.*
(Continued)

*Primary Examiner* — Dmitry Levitan
(74) *Attorney, Agent, or Firm* — Birch, Stewart, Kolasch & Birch, LLP

(57) ABSTRACT

Provided are a method and an apparatus for allocating, by a first OFDM system and a second OFDM system, frequency resources, which are multiplexed in a frequency region, in a wireless communication system. Specifically, the sizes of the frequency resources of the first OFDM system, which corresponds to an existing OFDM, and the second OFDM system, which corresponds to a UF-OFDM, are determined. Adjacent subcarriers are instructed to allocate any one of a guard carrier and a subcarrier to which null data is allocated,
(Continued)

while performing frequency resource allocation between the first and second OFDM systems in accordance with the determined sizes of the frequency resources. The information regarding the frequency resource allocation, which comprises information indicative of either the guard carrier or the subcarrier, is transmitted.

6 Claims, 17 Drawing Sheets

(51) Int. Cl.
H04L 27/26 (2006.01)
H04W 28/08 (2009.01)
H04W 28/26 (2009.01)
H04W 16/14 (2009.01)
H04L 5/00 (2006.01)

(52) U.S. Cl.
CPC ......... *H04L 5/0044* (2013.01); *H04L 5/0062* (2013.01); *H04L 5/0066* (2013.01); *H04L 5/0092* (2013.01); *H04L 27/26* (2013.01); *H04L 27/2626* (2013.01); *H04L 27/2627* (2013.01); *H04W 16/14* (2013.01); *H04W 28/085* (2013.01); *H04W 28/26* (2013.01); *H04L 5/001* (2013.01)

(58) Field of Classification Search
USPC .................... 370/310, 312, 328, 329, 437
See application file for complete search history.

(56) References Cited

U.S. PATENT DOCUMENTS

| | | | | |
|---|---|---|---|---|
| 7,672,383 | B2* | 3/2010 | Namgoong | H04B 1/1027 375/260 |
| 7,869,530 | B2* | 1/2011 | Popoli | H04L 27/2602 342/373 |
| 7,974,176 | B2* | 7/2011 | Zheng | H04B 1/707 370/203 |
| 8,665,695 | B2* | 3/2014 | Liao | H04L 27/2647 370/208 |
| 8,942,311 | B2* | 1/2015 | Zhang | H04L 5/001 375/296 |
| 9,071,399 | B2* | 6/2015 | Drewes | H04L 5/0044 |
| 9,647,816 | B2* | 5/2017 | Yu | H04L 5/0048 |
| 9,716,606 | B2* | 7/2017 | Lee | H04L 27/2085 |
| 9,717,086 | B2* | 7/2017 | Zhang | H04L 5/0041 |
| 10,038,585 | B2* | 7/2018 | Wild | H04L 27/264 |
| 2007/0249298 | A1* | 10/2007 | Sawada | H04B 1/56 455/103 |
| 2015/0351098 | A1* | 12/2015 | Schellmann | H04L 5/0064 370/329 |
| 2016/0099789 | A1* | 4/2016 | Zhang | H04J 11/003 370/329 |

OTHER PUBLICATIONS

Wild et al, "5G air interface design based on Universal Filtered (UF-)OFDM", IEEE Xplore Digital Library, IEEE-SA, IEEE Spectrum, Stuttgart, Germany, Aug. 20-23, 2014, pp. 699-704.

Wunder et al, "5GNOW: Intermediate frame structure and transceiver concepts", IEEE Xplore Digital Library, IEEE-SA, IEEE Spectrum, Berlin, Germany, Dec. 8-12, 2014, pp. 565-570.

* cited by examiner

--Prior Art--

--Prior Art--

--Prior Art--

--Prior Art--

METHOD FOR ALLOCATING FREQUENCY RESOURCES IN WIRELESS COMMUNICATION SYSTEM, AND APPARATUS USING THE SAME

CROSS REFERENCE TO RELATED APPLICATIONS

This application is the National Phase of PCT International Application No. PCT/KR2015/010077, filed on Sep. 24, 2015, which claims priority under 35 U.S.C. 119(e) to U.S. Provisional Application No. 62/158,544, filed on May 8, 2015, all of which are hereby expressly incorporated by reference into the present application.

BACKGROUND OF THE INVENTION

Field of the Invention

The present invention relates to wireless communication and, most particularly, to a method for allocating frequency resources in a wireless communication system and an apparatus using the same.

Related Art

The next generation multimedia wireless communication system, which has recently been very actively and extensively researched and developed, is being request to be evolved as a system that can process and transmit diverse information, such as images, wireless data (or radio data), and so on, excelling the initial voice-based services. For example, hologram and real-time Ultra High Definition (UHD) high picture quality services, which can provide higher transmission rates by using a larger amount of frequency resource as compared to the conventional wideband services. Additionally, mission critical services requesting low latency, emergency services or tactical internet service requesting ultimately low latency, and services such as Vehicle to Everything (V2X) are being requested. Furthermore, massive machine communication, sensor networks, and so on, for supporting a massive number of devices are also be requested.

The purpose of such next generation wireless communication system is to allow reliable communication to be carried out regardless of the position and mobility of multiple users. However, the wireless channel has non-ideal characteristics, such as path loss, noise, fading caused by a multi-path, Inter Symbol Interference (ISI), or a Doppler effect caused by the mobility of the device. A wide range of technology is being researched and developed in order to overcome such non-ideal characteristics of the wireless channel and to enhance reliability in wireless communication.

It is difficult to provide the above-described services by using the Cyclic Prefix-Orthogonal Frequency Division Multiplexing (CP-OFDM) scheme of the conventional (or legacy) Long Term Evolution (LTE) system. Most particularly, by using the conventional LTE system, it is difficult to satisfy the request for low latency communication by using a Transmission Time Interval (TTI) having the length of 1 ms. Accordingly, new types of waveforms that can satisfy such request are emerging. For example, new waveforms, such as Filter Bank Multi Carrier (FBMC), Generalized Frequency Division Multiplexing (GFDM), Universal Filtered-OFDM (UF-OFMD) and so on, are being discussed as the adequate waveforms for the next generation wireless communication system services.

SUMMARY OF THE INVENTION

Technical Objects

An object of this specification is to provide a method for allocating frequency resources in a wireless communication system, and an apparatus using the same.

Technical Solutions

This specification proposes a method for allocating frequency resources in a wireless communication system having a first OFDM system and a second OFDM system multiplexed in a frequency domain.

The terms used herein will first be described. A first OFDM system corresponding to a legacy OFDM system includes a Cyclic Prefix (CP) inserting unit being connected to an inverse discrete Fourier transform (IDFT) block. A second OFDM system corresponding to a UF-OFDM system includes a band pass filter performing IDFT in frequency resource block units and filtering signals outputted from an IDFT block. Unlike the first OFDM system, which has only one IDFT block, the second OFDM system has a plurality of IDFT blocks and a plurality of band pass filters being in one-to-one correspondence with the plurality of IDFT blocks.

Additionally, a guard subcarrier and a subcarrier transmitting null data are differentiated from one another, in that the guard subcarrier does not transmit both control data and user data and that the subcarrier transmitting null data does not transmit user data only and transmits control data. More specifically, the guard subcarrier is incapable of transmitting control information, such as a reference signal (RS), and the subcarrier transmitting data is only incapable of transmitting user data and is capable of transmitting control information, such as a RS.

Firstly, frequency resource sizes of the first OFDM system and the second OFDM system are determined. More specifically, this determines how much the frequency resource of the first OFDM system is allocated in resource block units and how much the frequency resource of the second OFDM system is allocated in resource block units within the total (or entire) frequency band.

Frequency resource allocation between the first OFDM system and the second OFDM system is indicated in accordance with the determined frequency resource sizes. More specifically, any one of a guard subcarrier and null data is indicated to be allocated to an adjacent subcarrier being adjacent to frequency resources of the first and second OFDM systems, and, then, frequency resource allocation is performed as indicated.

If the guard subcarrier is indicated to be used, and if a CRS is not positioned in the adjacent subcarrier, the guard subcarrier is allocated to the adjacent subcarrier. Additionally, if a CRS is positioned in the adjacent subcarrier, the guard subcarrier is allocated to a subcarrier position that is shifted as much as one subcarrier from the adjacent subcarrier.

Additionally, a step of determining frequency resource indexes of the first and second OFDM systems is further included. If the guard subcarrier is indicated to be used, and if a CRS is positioned in the adjacent subcarrier, shifting occurs as much as one subcarrier each time. Accordingly, a subcarrier that deviates from the total frequency band is generated. A number of subcarriers that deviate from the total frequency band corresponds to a number of shifted subcarriers. Therefore, in case a frequency resource index of the first OFDM system corresponds to a last index, no signal is transmitted from a subcarrier of the first OFDM that deviates from the entire frequency band, and, in case a frequency resource index of the second OFDM system corresponds to a last index, user data are transmitted from a subcarrier of the second OFDM that deviates from the entire frequency band. This is due to the characteristic of the first OFDM system having a high level of out-of-band emission and the characteristic of the second OFDM system having a low level of out-of-band emission.

Information on the frequency resource allocation, which includes information indicating any one of the guard subcarrier and the null data to be allocated, is transmitted to the receiving end. More specifically, information on whether the guard subcarrier is to be allocated or whether the subcarrier transmitting null data is to be allocated and information on how to arrange the frequency resource should be notified to the receiving end.

If the null data are indicated to be used, the information on the frequency resource allocation further includes information indicating null data to be allocated to any one of a subcarrier of the first OFDM system and a subcarrier of the second OFDM system each being adjacent to one another. This is to prevent loss in CRS from occurring, of a CRS is positioned in a subcarrier of any one of the two systems being adjacent to one another and to be capable of allocating null data to the other one of the two systems.

By using the above-described information, frequency resource allocation may be performed in a wireless communication system having a first OFDM system and a second OFDM system multiplexed in the frequency domain.

Additionally, this specification proposes a wireless device for allocating frequency resources in a wireless communication system having a first OFDM system and a second OFDM system multiplexed in a frequency domain.

The wireless device includes a radio frequency (RF) unit transmitting and receiving radio signals, and a processor operatively connected to the RF unit. The processor determines frequency resource sizes of the first OFDM system and the second OFDM system. More specifically, this determines how much the frequency resource of the first OFDM system is allocated in resource block units and how much the frequency resource of the second OFDM system is allocated in resource block units within the total (or entire) frequency band.

The processor indicates frequency resource allocation between the first OFDM system and the second OFDM system in accordance with the determined frequency resource sizes. More specifically, any one of a guard subcarrier and null data is indicated to be allocated to an adjacent subcarrier being adjacent to frequency resources of the first and second OFDM systems, and, then, frequency resource allocation is performed as indicated.

Information on the frequency resource allocation, which includes information indicating any one of the guard subcarrier and the null data to be allocated, is transmitted to the receiving end. More specifically, information on whether the guard subcarrier is to be allocated or whether the subcarrier transmitting null data is to be allocated and information on how to arrange the frequency resource should be notified to the receiving end.

By using the above-described information, frequency resource allocation may be performed in a wireless communication system having a first OFDM system and a second OFDM system multiplexed in the frequency domain.

Effects of the Invention

Even in a case of multiplexing a legacy OFDM system and a UF-OFDM system applying a next generation waveform in one user equipment (or device), interference between the legacy OFDM system and the UF-OFDM system may be avoided by adequately considering frequency resource allocation. Accordingly, a service of the legacy OFDM system and a service of the UF-OFDM system may be provided in combination.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
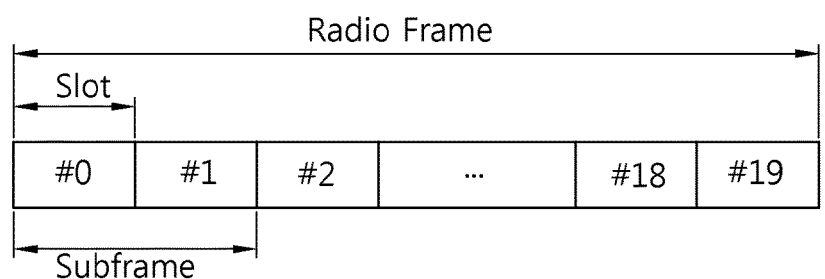
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
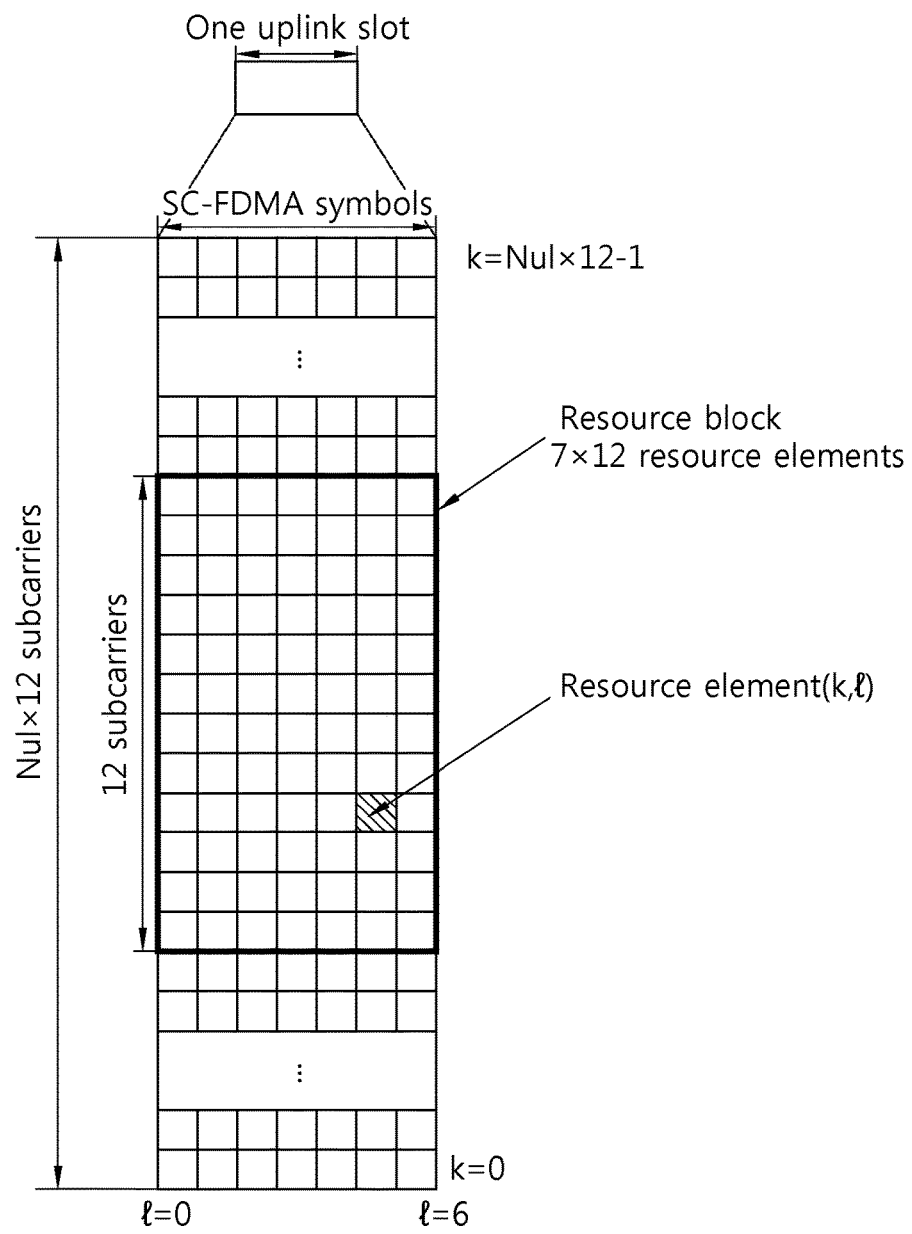
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, the UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
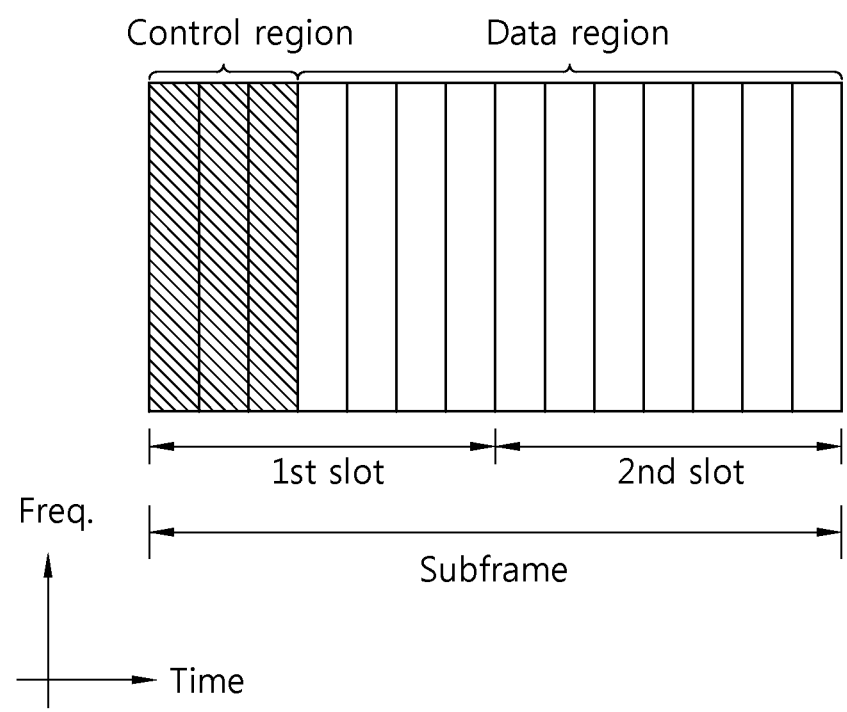
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$, k−1 are assigned to CCEs. A total number of CCEs within a subframe may also be different in each subframe because the number of OFDM symbols included in a control region within a subframe may be different in each subframe.

Figure 4:
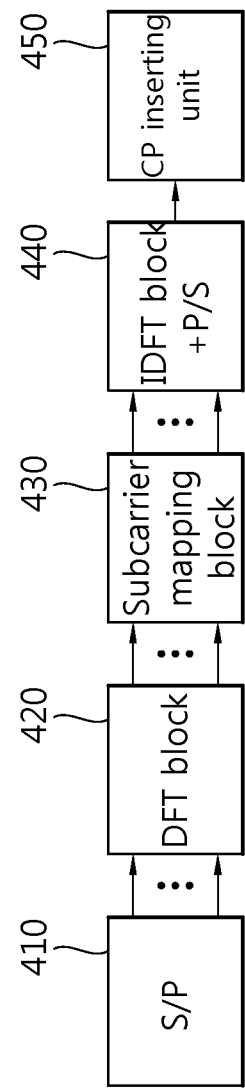
FIG. 4 is a block view illustrating a transmitting end of a legacy OFDM.

FIG. 4 is a block view illustrating a transmitting end of a legacy OFDM.

The legacy OFDM may correspond to a CP-OFDM, wherein a CP is inserted in an OFDM signal in order to resolve the problem of inter-symbol interference within one sub-carrier occurring due to a time-based spreading of the signal.

A transmitting end of the legacy OFDM system includes a S-to-P (S/P) block 410, a DFT block 420, a sub-carrier mapping block 430, an IDFT block and P-to-S (P/S) block 440, and a CP inserting unit 450. Also, the transmitting end of the legacy OFDM system may further include a channel coding unit (not shown) and a modulator (not shown).

The channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block 410 and may then be inputted to the DFT block 420.

The DFT block 420 performs DFT on the inputted symbols and outputs complex-valued symbols. For example, when N number of symbols are inputted, a DFT size may be equal to N (wherein N is an integer).

The sub-carrier mapping block 430 may also be referred to as a frequency domain data processing block because it maps complex-valued symbols to each sub-carrier. The complex-valued symbols may be mapped to resource elements that are allocated data transmission.

The IDFT block 440 performs IFFT on the inputted symbols and outputs a baseband signal for data corresponding to a time domain signal. Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within the IDFT block.

Being included in the IDFT block 440, the P-to-S (P/S) block 440 may perform parallel-to-serial conversion on the baseband signal being outputted from the IDFT block, and the CP inserting unit 450 copies an end part of the baseband signal for the data and inserts the copied end part in front of the baseband signal for data. Since Inter Symbol Interference (ISI) and Inter Carrier Interference (ICI) are prevented due to the CP insertion, orthogonality may also be maintained in the multi-path channel.

As described above, a transmission scheme, wherein IDFT is performed after a DFT spread, is referred to as SC-FDMA. More specifically, in an uplink, the transmitting end performs both DFT and IDFT. The SC-FDMA may also be referred to as a DFT spread-OFDM (DFTS-OFMD). In the SC-FDMA, peak-to-average power ratio (PAPR) or a cubic metric (CM) may be reduced. In case of using the SC-FDMA transmission scheme, transmission power efficiency may be increased in a device having limited power consumption. Accordingly, a user throughput may also be increased.

Figure 5:
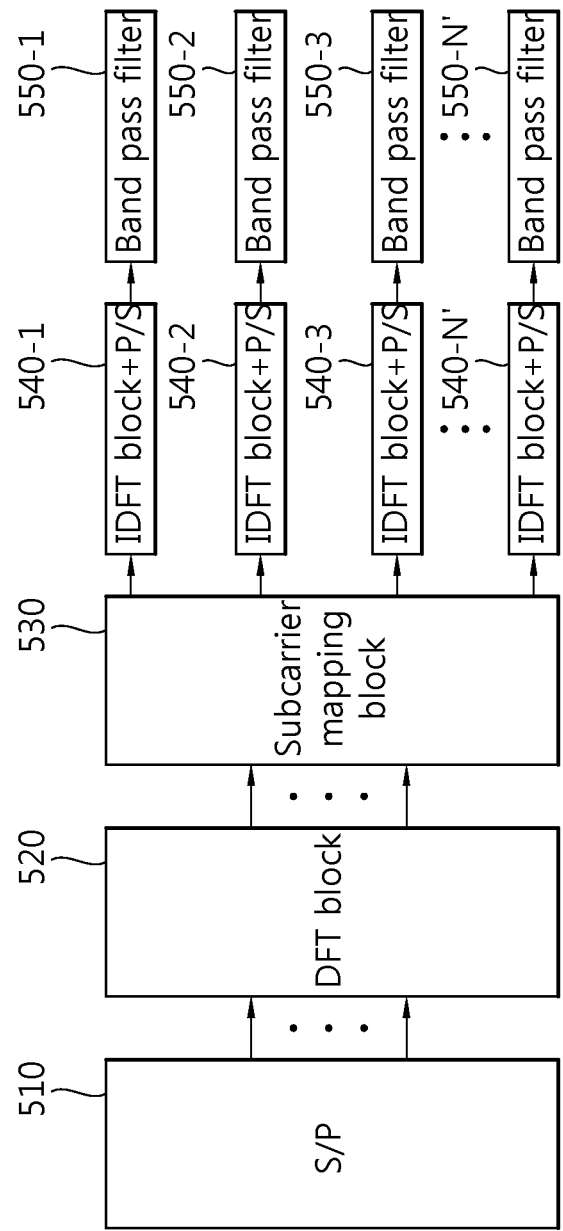
FIG. 5 is block view illustrating a transmitting end of a UF-OFDM.

FIG. 5 is block view illustrating a transmitting end of a UF-OFDM.

Unlike the legacy OFDM system, since the UF-OFDM system does not include a CP inserting unit, CP insertion is not performed on signals being outputted by the IDFT block. Additionally, a band pass filter filtering a signal that is outputted from the IDFT block may be inserted instead of the CP inserting unit. Unlike the legacy OFDM system, which includes only one IDFT block, the UF-OFDM system includes a plurality of IDFT blocks, and the UF-OFDM system is also configured to have a structure, wherein each of a plurality of band pass filters is in a one-to-one correspondence with the plurality of IDFT blocks. Each set of the plurality of IDFT blocks and the plurality of band pass filters may be applied to each sub-band in sub-band units. More specifically, the structure and operation procedures of a transmitting end included in the UF-OFDM system will hereinafter be described in detail.

The transmitting end of the UF-OFDM system includes a S-to-P (S/P) block 510, a DFT block 520, a sub-carrier mapping block 530, a plurality of IDFT blocks and P-to-S (P/S) blocks 540-1, 540-2, . . . , 540-N', and a plurality of band pass filters 550-1, 550-2, . . . , 550-N'. Also, the transmitting end of the UF-OFDM system may further include a channel coding unit (not shown) and a modulator (not shown).

Just as in the transmitting end of the legacy OFDM system, the channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block 510 and may then be inputted to the DFT block 520.

The DFT block 520 performs DFT on the inputted symbols and outputs complex-valued symbols. For example, when N number of symbols are inputted, a DFT size may be equal to N (wherein N is an integer).

The sub-carrier mapping block 530 may also be referred to as a frequency domain data processing block because it spreads out the outputted complex-valued symbols in the frequency domain and then maps the spread symbols to the sub-carriers. The sub-carrier mapping block maps the complex-valued symbols to the sub-carriers and outputs N' number of sub-bands (wherein N' is an integer). Herein, the N' number of sub-bands may be indicated as sub-band #1, sub-band #2, . . . , sub-band #N'. A Null may be inserted between each two consecutive sub-bands. The complex-valued symbols within one sub-band may be mapped to consecutive sub-bands within the frequency domain. More specifically, a concentrated mapping method may be used in one sub-band. Accordingly, the signal that is mapped as described above may correspond to the sub-band.

The plurality of IDFT blocks 540-1, 540-2, . . . , 540-N' may perform IFFT for each sub-band among the N' number of sub-bands and may transmit a baseband signal for data corresponding to a time domain signal. More specifically, a $n^{th}$ IDFT block 540-n may perform IFFT to sub-block #n and may then output an $n^{th}$ baseband signal (wherein n=1, 2, N'). Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within each of the IDFT blocks 540-1, 540-2, . . . , 540-N'.

The P-to-S block is included in each of the plurality of IDFT blocks 540-1, 540-2, . . . , 540-N' and may perform parallel to serial conversion on a baseband signal being outputted from each IDFT block. A plurality of band pass filters 550-1, 550-2, . . . , 550-N' may be in a one-to-one correspondence with the plurality of IDFT blocks 540-1, 540-2, . . . , 540-N' and may filter the baseband signal being outputted from the corresponding IDFT block. More specifically, the $n^{th}$ band pass filter filters a baseband signal, which is outputted from the $n^{th}$ IDFT block (wherein n=1, 2, . . . , N'). Accordingly, it will be apparent that the band pass filter is applied in sub-band units in the UF-OFDM system. Herein, the length of each band pass filter may be given as L.

Herein, the UF-OFDM system also corresponds to an OFDM system wherein DFT spread is adopted. More specifically, in an uplink, the transmitting end may perform both DFT and IDFT.

Figure 6:
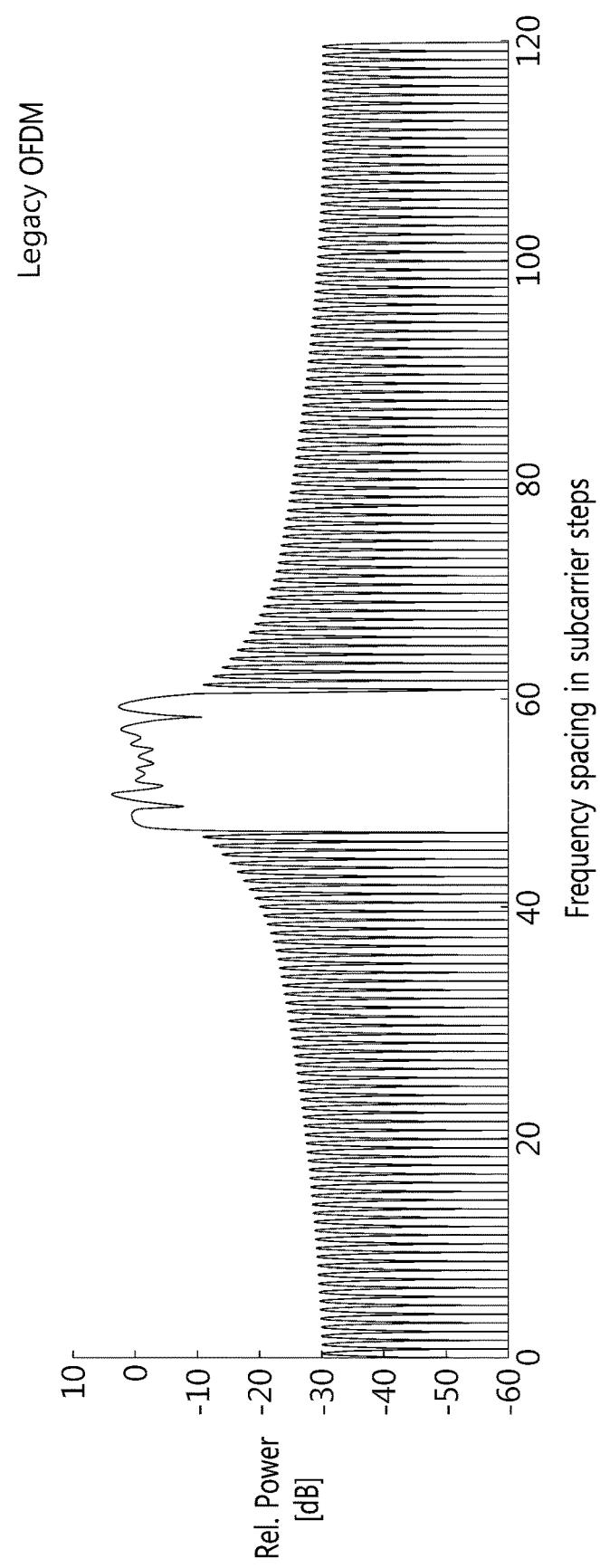
FIG. 6 is a graph indicating a power spectrum in a frequency domain of the conventional OFDM.

FIG. 6 is a graph indicating a power spectrum in a frequency domain of the conventional OFDM. And, FIG. 7 is a graph indicating a power spectrum in a frequency domain of the UF-OFDM.

Figure 7:
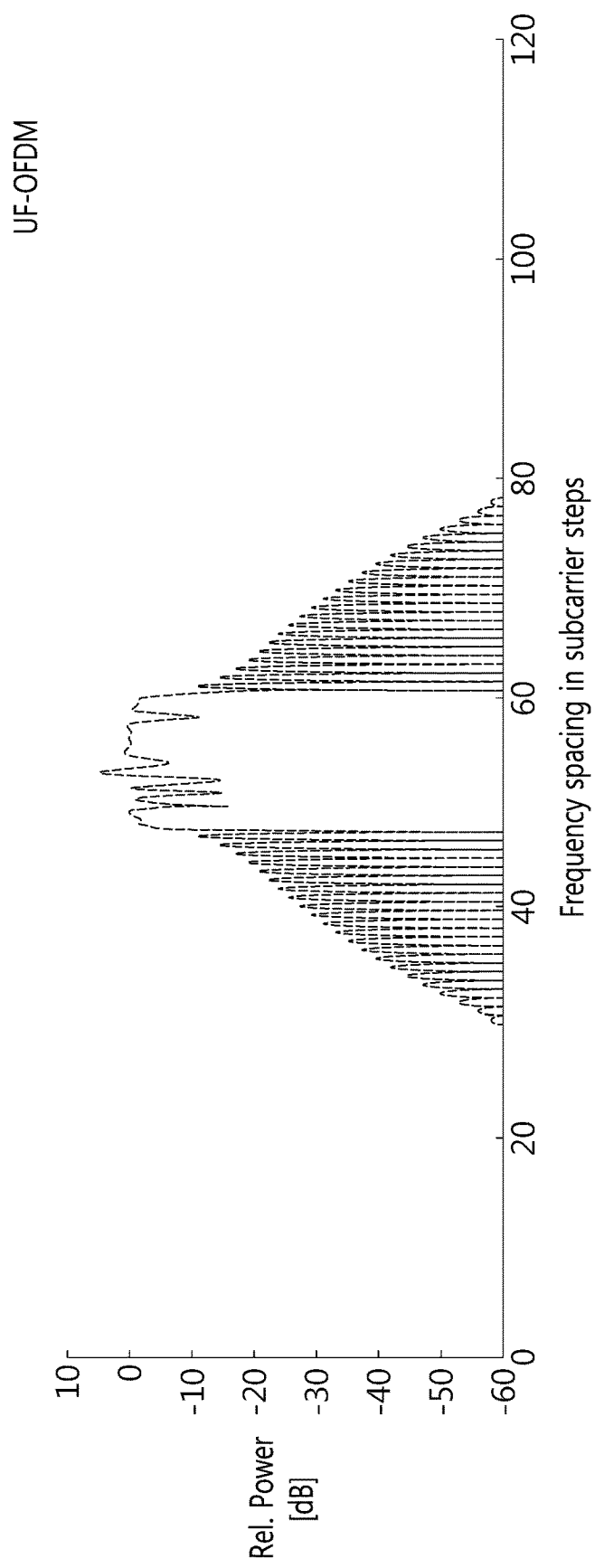
FIG. 7 is a graph indicating a power spectrum in a frequency domain of the UF-OFDM.

FIG. 6 and FIG. 7 show a comparison of power spectrums in an actual frequency domain of a legacy OFDM system, wherein CP-OFDM is applied, and a UF-OFDM system, wherein band pass filters are applied inn sub-band units. FIG. 6 illustrates a power spectrum in the frequency domain of the legacy OFDM system, and FIG. 7 illustrates a power spectrum in the frequency domain of the UF-OFDM system.

By adopting band pass filters in sub-band units, the UF-OFDM system may significantly reduce the influence caused to another neighboring band as compared to the legacy OFDM system. Such characteristic has a significant gain in the aspect of a usage of a fragmented spectrum in a situation where the current frequency resource is exhausted. Additionally, this characteristic also acts a base structure for the next generation technology communication.

Referring to FIG. 6, based on one sub-band, in case of the legacy OFDM system, the power of the signal influencing another band gradually weakens. Conversely, referring to FIG. 7, in case of the UF-OFDM, it is apparent that the power of the signal influencing another band weakens quickly. More specifically, due to the characteristic of reducing the influence caused to another neighboring signal by the signal is considered as a candidate for the next generation waveform.

The description provided in this specification is mainly based on a UF-OFDM system among the next generation waveforms for satisfying the requirements of low latency communication. However, the present invention will not be limited only to this, and, therefore, a system having diverse types of next generation waveforms may be applied herein.

It may be understood that such application of a next generation waveform has been considered to satisfy services of a next generation wireless communication system rather than to be used for the purpose of replacing all of the legacy services at once. Therefore, it is expected that the legacy services are provided through the legacy OFDM method. Eventually, this may lead to a situation where the legacy services and new services for the user device are provided in combination. In this specification, it shall be considered that the legacy OFDM system and the system applying the next generation waveform co-exist in one user equipment (or device). This method is referred to as in-band multiplexing.

Figure 8:
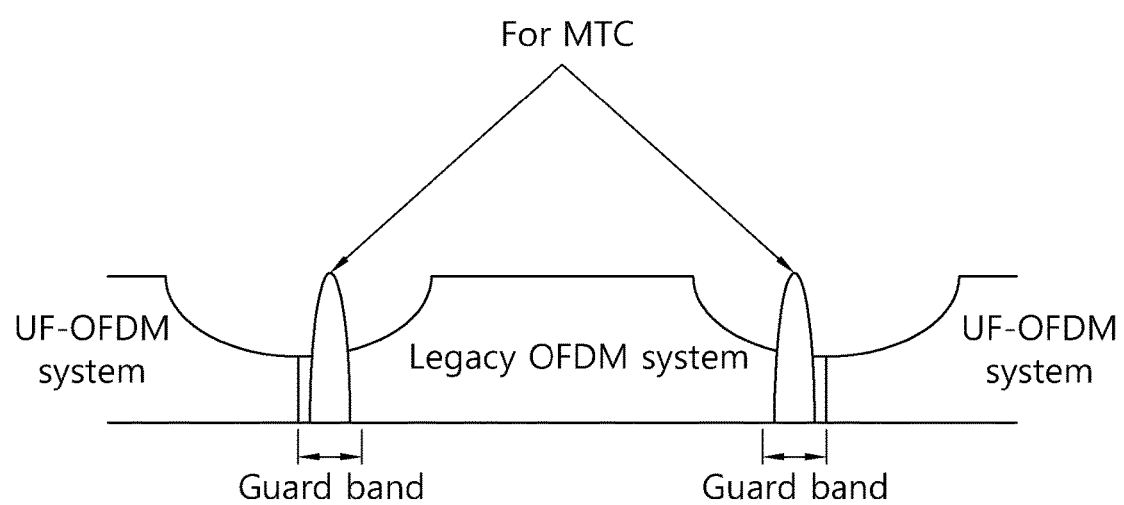
FIG. 8 shows a method of multiplexing a legacy OFDM system and a UF-OFDM system by using a guard band.

FIG. 8 shows a method of multiplexing a legacy OFDM system and a UF-OFDM system by using a guard band.

FIG. 8 shows an example of performing multiplexing within a band by using a guard band for the co-existence of the legacy OFDM system and the UF-OFDM system applying a next generation waveform. Herein, the guard band corresponds to a frequency band that is empty (or reserved without being used) in order to prevent a band from causing influence of interference to another allocated band.

FIG. 8 shows a method of keeping a guard band in the legacy OFDM system so that the legacy OFDM system and the UF-OFDM system can be simultaneously supported in a Machine Type Communication (MTC) device. In order to simultaneously support the legacy system and the UF-OFDM system respectively applying different waveforms each being adjacent to one another, an example of multiplexing both systems in a time or frequency domain may be given. However, since different waveforms are applied, it will be apparent that orthogonality is destroyed (or no longer maintained) in case the legacy OFDM system and the UF-OFDM system are multiplexed. Therefore, since interference inevitably occurs between the legacy OFDM system and the UF-OFDM system respectively applying different waveforms each being adjacent to one another, a method for allocating time-frequency resource in order to control such interference is proposed herein. Accordingly, the influence caused by the legacy OFDM system shall be minimized.

Hereinafter, a method of multiplexing the legacy OFDM system and the UF-OFDM system so that interference between different waveforms each being adjacent to one another can be controlled through a result of multiplexing both systems will be described in detail.

Figure 9:
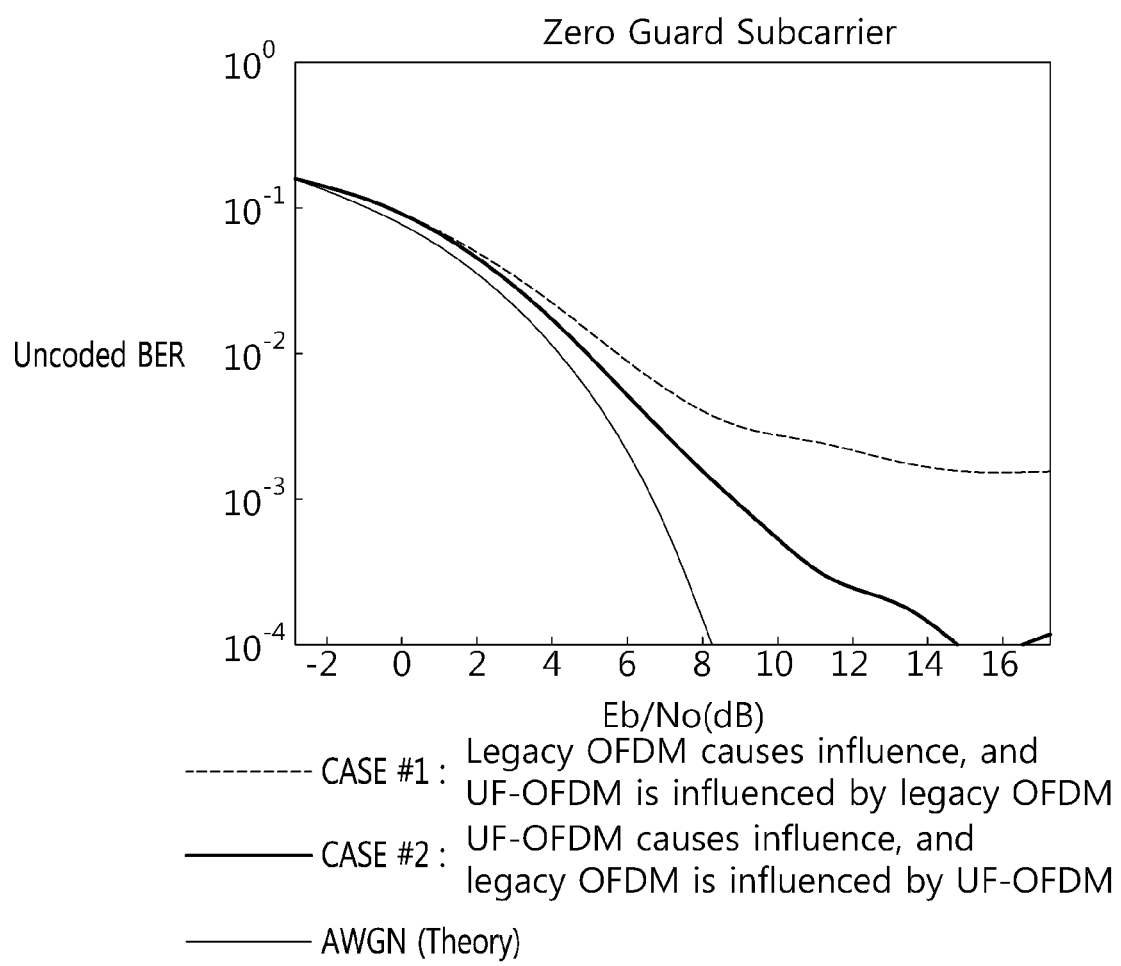
FIG. 9 is a graph showing a result of multiplexing the legacy OFDM system and the UF-OFDM system without keeping a guard subcarrier between different waveforms of the legacy OFDM system and the UF-OFDM system.
Figure 10:
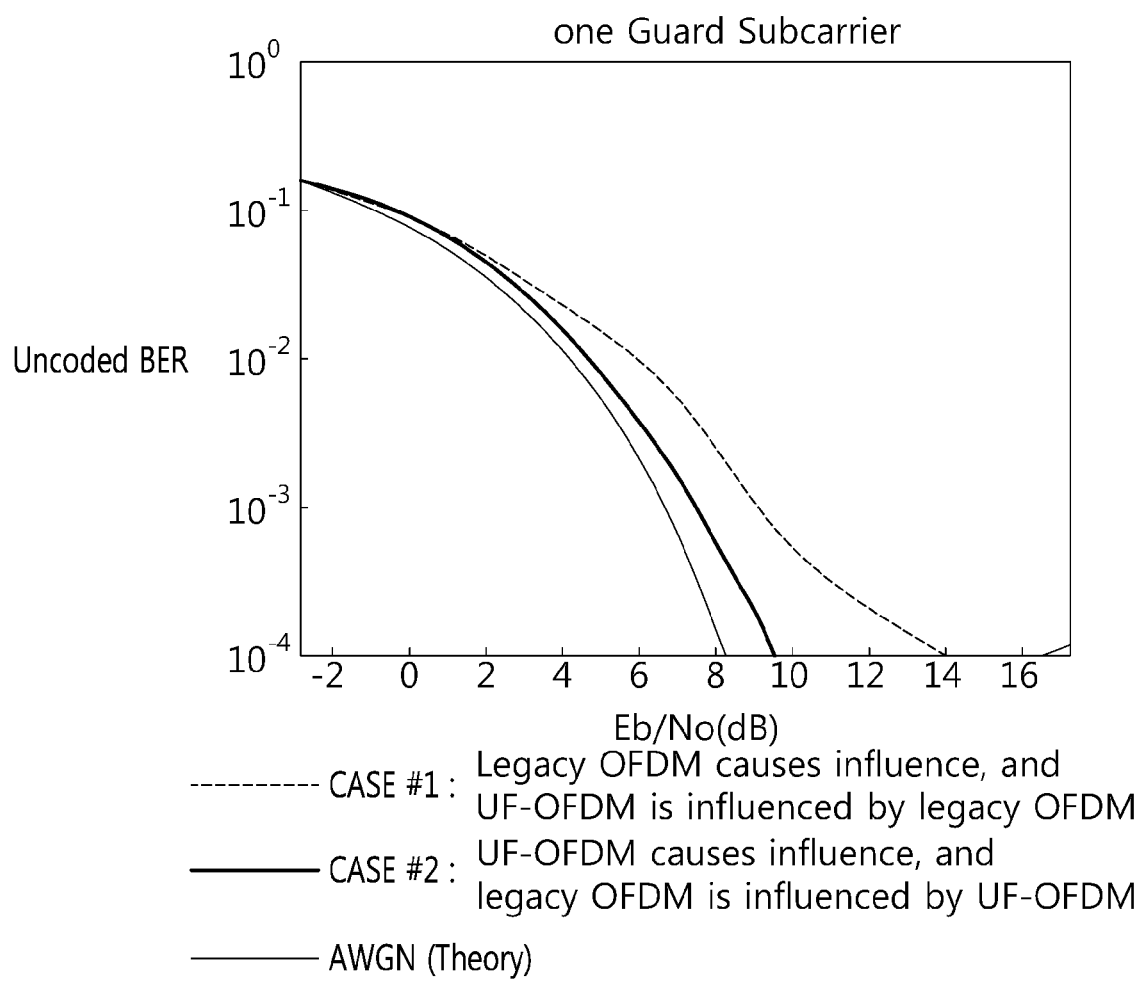
FIG. 10 is a graph showing a result of multiplexing the legacy OFDM system and the UF-OFDM system while keeping a guard subcarrier between different waveforms of the legacy OFDM system and the UF-OFDM system.

FIG. 9 is a graph showing a result of multiplexing the legacy OFDM system and the UF-OFDM system without keeping a guard subcarrier between different waveforms of the legacy OFDM system and the UF-OFDM system. FIG. 10 is a graph showing a result of multiplexing the legacy OFDM system and the UF-OFDM system while keeping a guard subcarrier between different waveforms of the legacy OFDM system and the UF-OFDM system.

FIG. 9 shows a case when a guard subcarrier is not kept between different waveforms of the legacy OFDM system and the UF-ODFM system. FIG. 10 shows a case when one guard subcarrier is kept between different waveforms of the legacy OFDM system and the UF-OFDM system. Herein, the guard subcarrier corresponds to a subcarrier that is reserved without being used in order to prevent any influence caused by interference.

FIG. 9 shows a case when a waveform of the legacy OFDM and a waveform of the UF-OFDM are allocated so as to be adjacent to one another in the frequency domain without keeping any guard subcarrier between the waveforms. Herein, an asynchronous situation is considered for the synchronization between the waveforms, and the level of asynchronization has a uniform distribution starting from 0 to a half symbol. Referring to CASE #1, since the legacy OFDM has a high level of out-of-band (OOB) emission, it is apparent that the legacy OFDM causes influence to a large portion of the waveform of the UF-OFDM. Referring to CASE #2, since the UF-OFDM has a low level of out-of-band (OOB) emission, it is apparent that the UF-OFDM causes influence to a small portion of the waveform of the legacy OFDM.

FIG. 10 shows a case when a waveform of the legacy OFDM and a waveform of the UF-OFDM are allocated so as to be adjacent to one another in the frequency domain while keeping one guard subcarrier between the waveforms. Herein, an asynchronous situation is considered for the synchronization between the waveforms, and the level of asynchronization has a uniform distribution starting from 0 to a half symbol. Referring to CASE #1, since the legacy OFDM has a high level of out-of-band (OOB) emission, it is apparent that the legacy OFDM causes influence to a large portion of the waveform of the UF-OFDM. Referring to CASE #2, since the UF-OFDM has a low level of out-of-band (OOB) emission, it is apparent that the UF-OFDM causes influence to a small portion of the waveform of the legacy OFDM.

Referring to FIG. 10, as compared to FIG. 9, it is apparent that less influence of interference may be caused, when the waveform of the legacy OFDM and the waveform of the UF-OFDM are adjacent to one another. More specifically, it is apparent that performed in enhanced by simply separating the two different waveforms by placing (or keeping) one guard subcarrier between the two waveforms. Most particularly, it is apparent in CASE #2 of FIG. 10 that the waveform of the legacy OFDM receives almost no influence of interference from the waveform of the UF-OFDM.

Based on the above-described result, a method for controlling interference by keeping a guard subcarrier between a waveform of the legacy OFDM and a waveform of the UF-OFDM is proposed below.

Figure 11:
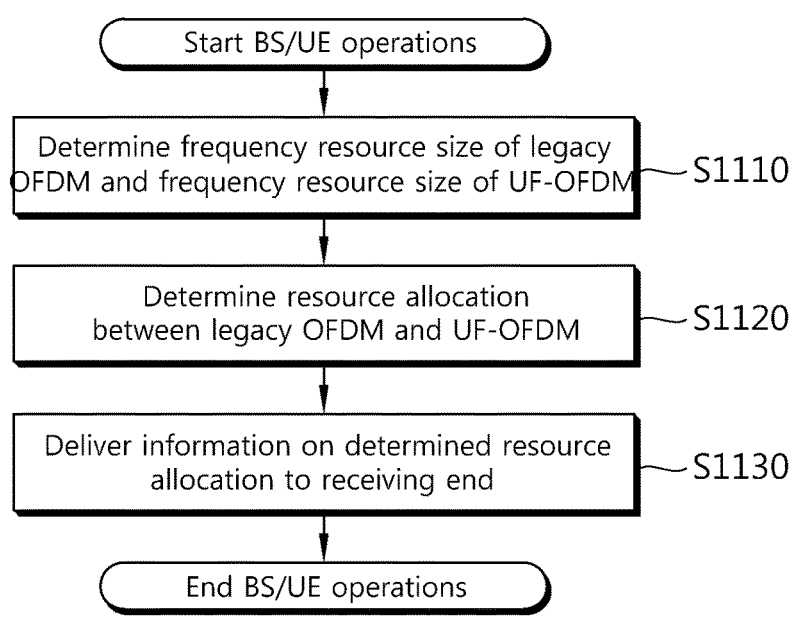
FIG. 11 is a flow chart showing a procedure for multiplexing the legacy OFDM system and the UF-OFDM system.

FIG. 11 is a flow chart showing a procedure for multiplexing the legacy OFDM system and the UF-OFDM system.

FIG. 11 proposes a method for adaptively allocating a guard subcarrier and a subcarrier transmitting null data for multiplexing the legacy OFDM system and the UF-ODFM system. Herein, the guard subcarrier and the subcarrier transmitting null data may be differentiated from one another in that the guard subcarrier does not transmit both control data and user data and that the subcarrier transmitting null data does not transmit user data and transmits control data. More specifically, the guard subcarrier is also incapable of transmitting control information, such as a reference signal (RS). However, the subcarrier transmitting null data is only incapable of transmitting user data but capable of transmitting control information, such as a RS.

Firstly, in step S1110, a frequency resource size of the legacy OFDM system and a frequency resource size of the UF-OFDM system are determined. More specifically, this corresponds to a step of determining the sizes of frequency resources that are to be allocated to multiple user devices (or user equipments) within a total frequency band. The number of total subcarriers that are to be allocated to the waveforms of each system is determined by considering a traffic size of a device supporting the legacy OFDM and a traffic size of a device supporting the new OFDM. Herein, it is assumed that the number of subcarriers is determined in resource block (RB) units for compatibility with the legacy OFDM system. For example, based on 5 MHz, 25 resource blocks may be used in the current LTE system. If it is given that the number of resource blocks that are to be allocated to the waveform of the UF-OFDM is determined to be equal to 3, the number of resource blocks in the legacy OFDM is limited to a maximum of 22 resource blocks.

In step S1120, resource allocation between a waveform of the legacy OFDM and a waveform of the UF-OFDM is determined. As described above, in case different waveforms are allocated to be adjacent to one another, it will be apparent that performance degradation occurs due to interference caused by a destruction of orthogonality. Therefore, a method of performing resource allocation based on the above-described effects is determined. More specifically, a method for adaptively allocating a guard subcarrier or a subcarrier transmitting null data is proposed herein.

Embodiment #1: Method for Allocating a Guard Subcarrier Between a Waveform of the Legacy OFDM and a Waveform of the UF-OFDM As a method of keeping (or placing) at least one or more guard subcarriers at a part where a waveform of the legacy OFDM and a waveform of the UF-OFDM are adjacent to one another, this corresponds to a method of ensuring orthogonality through a loss in frequency resources. At this point, since at least one guard subcarrier is allocated between a waveform of the legacy OFDM and a waveform of the UF-OFDM, a method of performing allocation that applies a higher priority level in gathering (or grouping) frequency resources of the legacy OFDM and frequency resources of the UF-OFDM in one place. However, a frequency position for excellent performance actually exists separately in accordance with a frequency response size of the user device. Therefore, in this case, a state when the waveform of the legacy OFDM and the waveform of the UF-OFDM are intermixed by being located at diverse positions within a frequency band may be considered. More specifically, the waveform of the legacy OFDM and the waveform of the UF-OFDM are intermixed for each resource block in accordance with the frequency resource size, which is determined in step S1110.

At this point, if a guard subcarrier is allocated to a position of a Cell-specific Reference Signal (CRS) of the legacy LTE system, performance degradation may occur in operations, such as channel estimation, due to a loss in the CRS. Therefore, the guard subcarrier should be allocated to a position where a common RS, such as the CRS of the legacy LTE system, does not exist.

Figure 12:
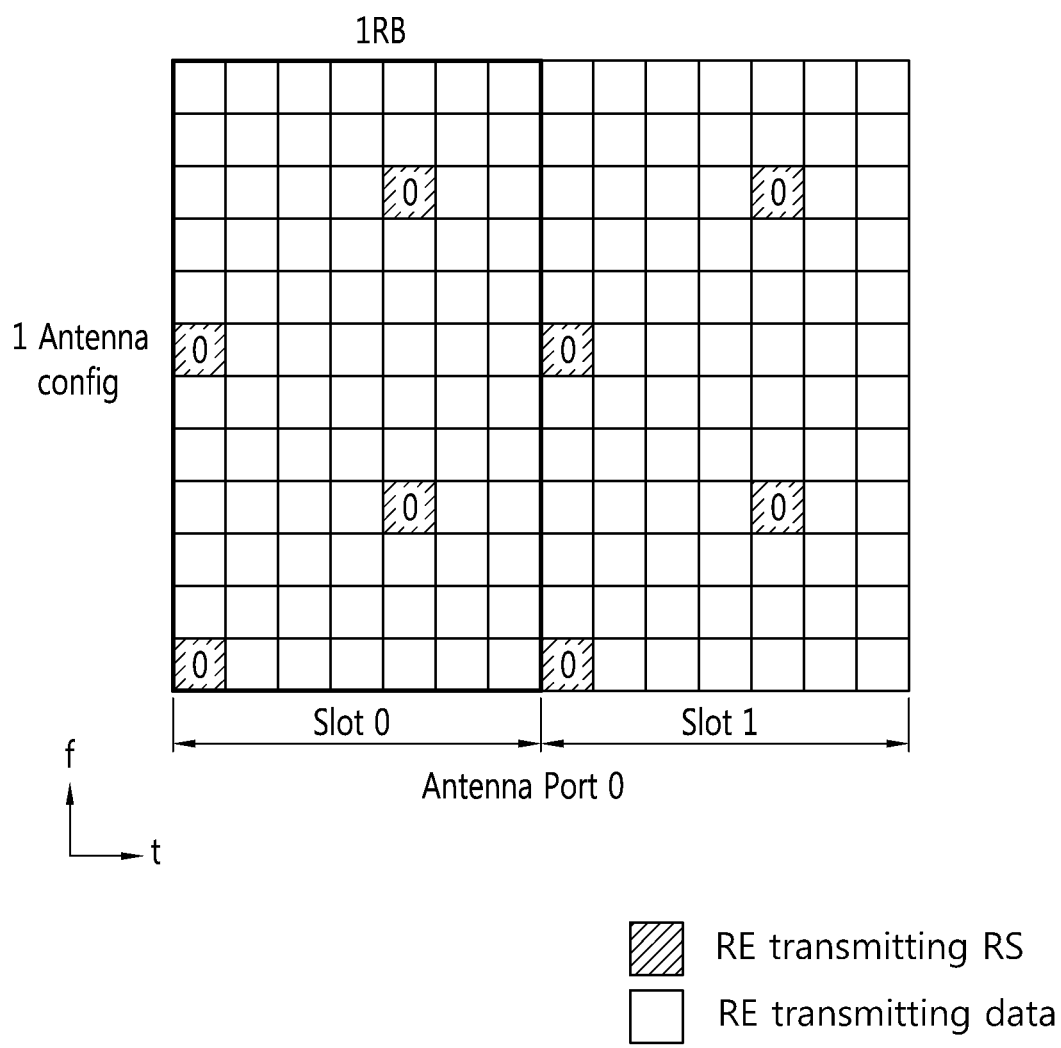
FIG. 12 shows a CRS position within a time-frequency resource in a downlink having one antenna port.
Figure 13:
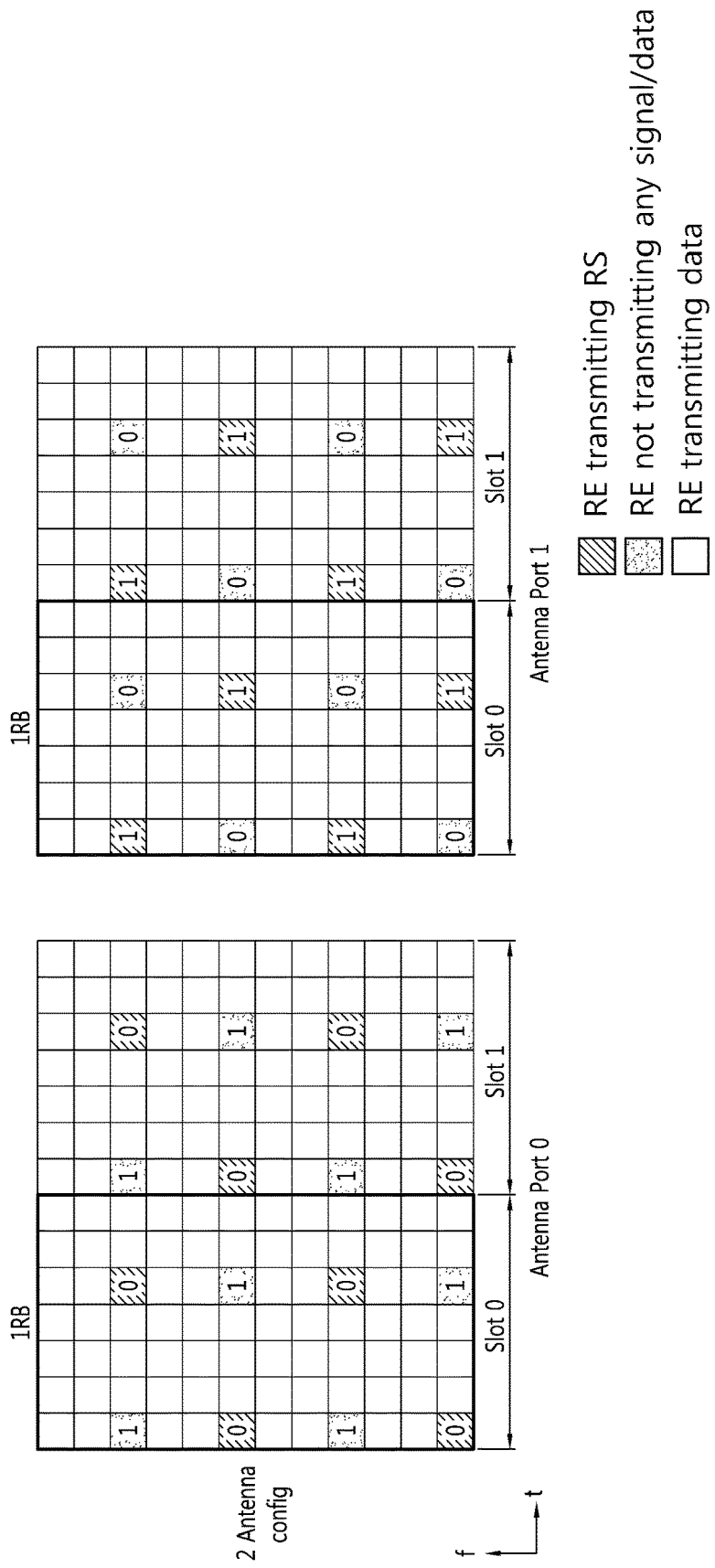
FIG. 13 shows a CRS position within a time-frequency resource in a downlink having two antenna ports.
Figure 14:
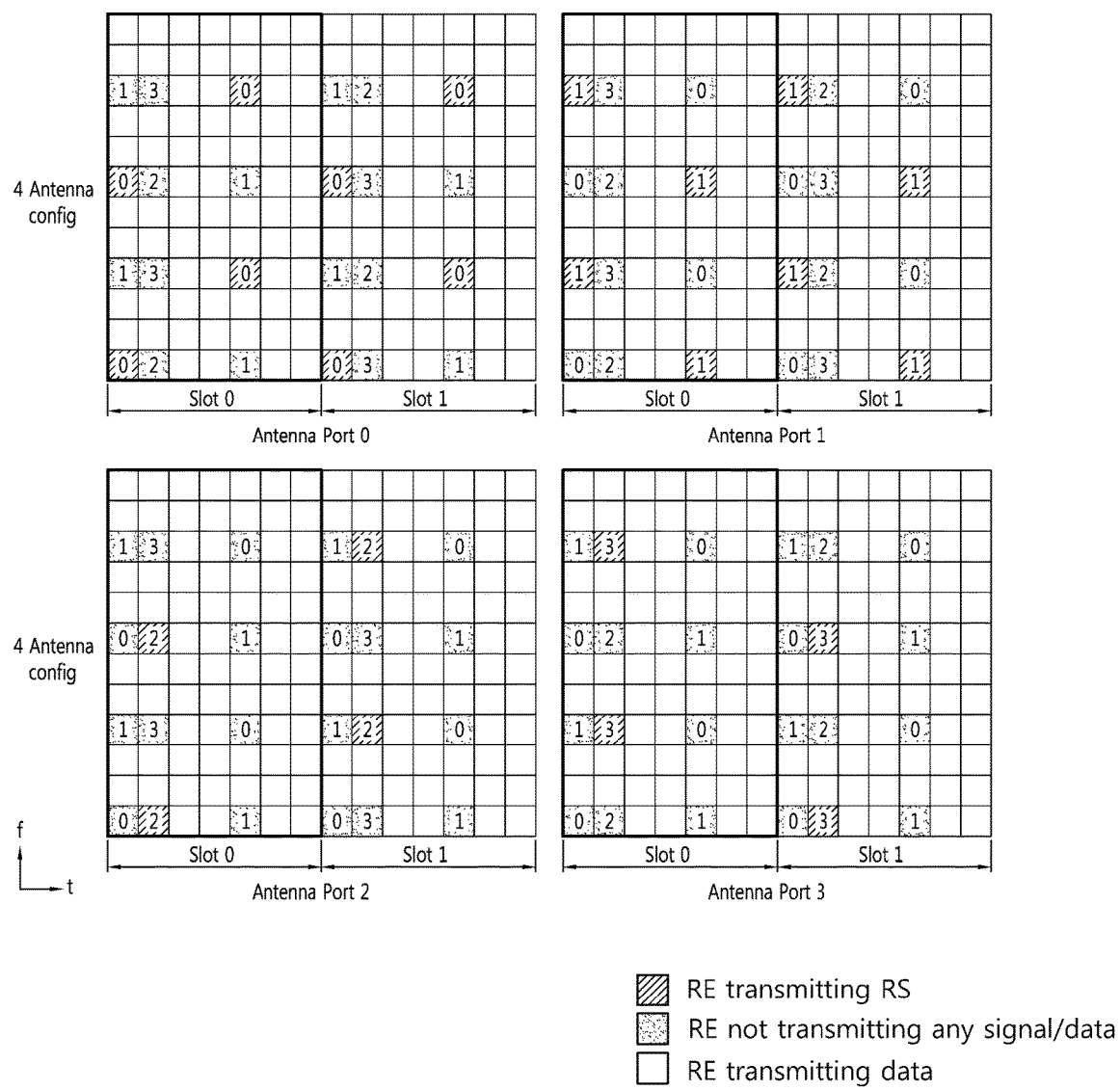
FIG. 14 shows a CRS position within a time-frequency resource in a downlink having four antenna ports.

FIG. 12 shows a CRS position within a time-frequency resource in a downlink having one antenna port. FIG. 13 shows a CRS position within a time-frequency resource in a downlink having two antenna ports. FIG. 14 shows a CRS position within a time-frequency resource in a downlink having four antenna ports.

The CRS pattern is arranged in resource block units (1 RB). In case of FIG. 12, a CRS is transmitted from a position of antenna port 0. In case of FIG. 13, a CRS is transmitted only from a position of antenna port 0 in antenna port 0, and a CRS is transmitted only from a position of antenna port 1 in antenna port 1. In case of FIG. 14, a CRS is transmitted only from a position of antenna port 0 in antenna port 0, a CRS is transmitted only from a position of antenna port 1 in antenna port 1, a CRS is transmitted only from a position of antenna port 2 in antenna port 2, and a CRS is transmitted only from a position of antenna port 3 in antenna port 3.

Eventually, a guard subcarrier should not be allocated to a subcarrier in which a CRS is positioned in the corresponding antenna port.

Figure 15:
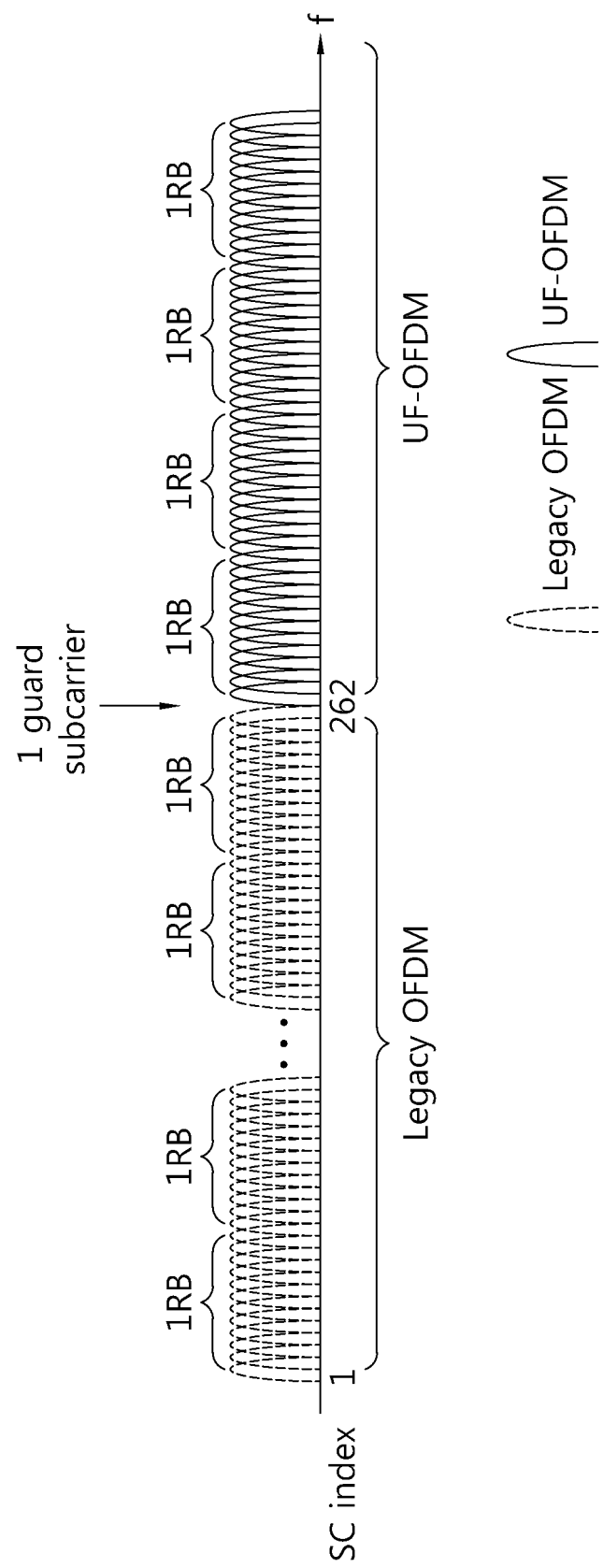
FIG. 15 shows an example of using one guard subcarrier between the legacy OFDM system and the UF-OFDM system.

FIG. 15 shows an example of using one guard subcarrier between the legacy OFDM system and the UF-OFDM system.

Herein, FIG. 15 proposes an example when 25 resource blocks are used in a downlink based on 5 MHz in accordance with the current LTE system, and, among the 25 resource blocks, 4 resource blocks are allocated to the waveform of the UF-OFDM. Additionally, it is assumed herein that one resource block has 12 subcarriers, and, therefore, the total frequency band based on 5 MHz has 300 resource blocks.

Additionally, it is assumed in FIG. 15 that the number of guard subcarriers between different waveforms is equal to 1. However, this is merely an example. And, therefore, this specification includes all diverse arrangements of the waveform of the legacy OFDM and the waveform of the UF-OFDM.

FIG. 15 corresponds to a case when an index is assigned to each subcarrier in the frequency domain and when one guard subcarrier is allocated to $263^{rd}$ subcarrier. By allocating a guard subcarrier to a subcarrier being adjacent to a waveform of the legacy OFDM and a waveform of the UF-OFDM, interference between the two waveforms may be reduced. However, there may be a case when a CRS is located at the $263^{rd}$ subcarrier, which corresponds to the adjacent subcarrier. In this case, in order to prevent loss in CRS, the resource block is shifted rightward as much as one subcarrier, and, then, a position that is shifted as much as one subcarrier from the $263^{rd}$ subcarrier is reserved (or left unused) so as to allocate a guard subcarrier thereto. More specifically, in FIG. 15, the CRS of the 263$^{rd}$ subcarrier is left unchanged, and a guard subcarrier is allocated to a 264$^{th}$ subcarrier. Herein, the adjacent subcarrier may correspond to a subcarrier that is positioned near the waveform of the legacy OFDM or may correspond to a subcarrier that is positioned near the waveform of the UF-OFDM.

Figure 16:
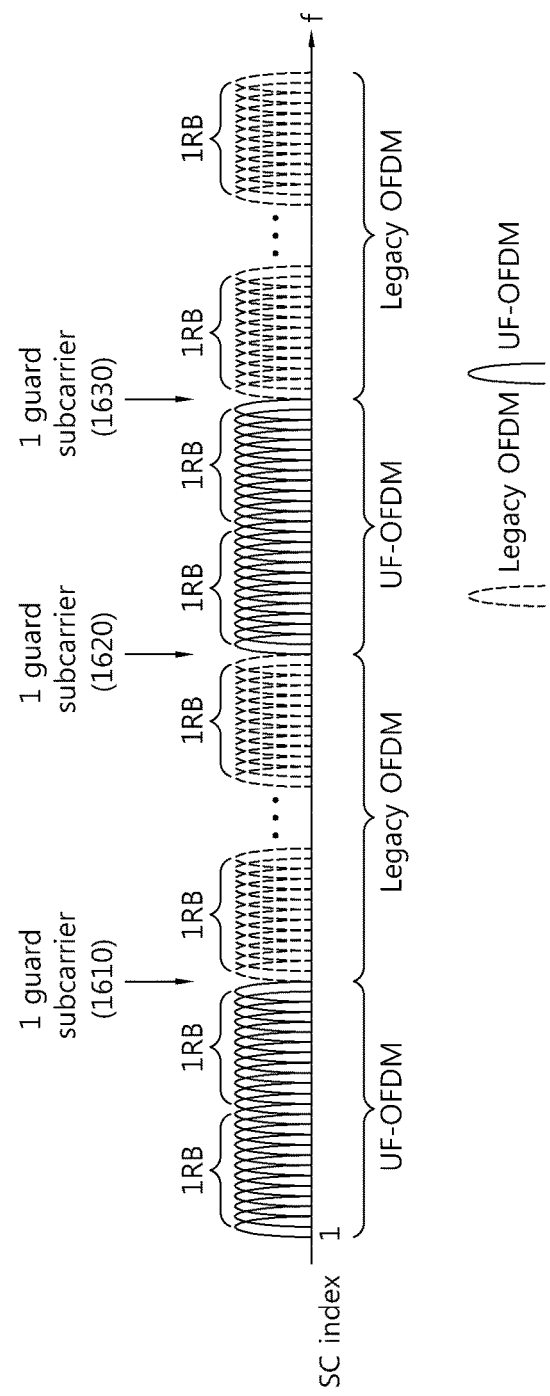
FIG. 16 shows an example of using three guard subcarriers between the legacy OFDM system and the UF-OFDM system.

FIG. 16 shows an example of using three guard subcarriers between the legacy OFDM system and the UF-OFDM system.

In the example of FIG. 16, since the waveform of the legacy OFDM and the waveform of the UF-OFDM are adjacent to one another only once, one adjacent subcarrier exists. However, as shown in FIG. 16, in case the waveform of the legacy OFDM and the waveform of the UF-OFDM are intermixed in each resource unit, a plurality of adjacent subcarriers exists. FIG. 16 shows an example wherein, since the waveform of the legacy OFDM and the waveform of the UF-OFDM are adjacent to tone another three times, three guard subcarriers 1610, 1620, and 1630 are allocated. More specifically, in order to avoid all interference between the legacy OFDM system and the UF-OFDM system, a guard subcarrier should be allocated to all of the plurality of adjacent subcarriers.

In case a CRS is positioned in the plurality of adjacent subcarrier, a guard subcarrier is allocated to a position shifted rightward as much as one subcarrier from the position with the subcarrier where the CRS exists. More specifically, when observing the entire frequency band, shifting occurs as many times as the number of subcarriers having a CRS positioned herein. For example, as shown in FIG. 16, among the 3 adjacent subcarriers 1610, 1620, and 1630, in case a CRS is positioned in each of two adjacent subcarriers 1620 and 1630, a guard subcarrier is allocated to a position shifted rightward as much as one subcarrier from the subcarrier 1620 having a first CRS positioned therein. Additionally, a guard subcarrier is allocated to a positioned shifted rightward as much as one subcarrier from the subcarrier 1630 having a second CRS positioned therein. Eventually, two subcarriers are shifted within the entire frequency band.

Additionally, since the position of the CRS varies in accordance with the cell ID, it may be determined whether or not to shift the resource block itself as much as one subcarrier in accordance with the CRS position, which is determined based on each cell ID.

In case shifting of the subcarrier occurs as described above, there may occur a case when a subcarrier positioned at a rightmost edge of the entire frequency band exceeds a 300$^{th}$ subcarrier, thereby deviating from the entire frequency band. At this point, as shown in FIG. 16, if the waveform positioned at the rightmost edge corresponds to the waveform of the legacy OFDM, in case of transmitting data, the corresponding part of the subcarrier transmits null data, and, in case a CRS exists therein, the corresponding subcarrier does not use the CRS. In other words, no signal is transmitted. However, as shown in FIG. 15, if the waveform positioned at the rightmost edge corresponds to the waveform of the UF-OFDM, since the corresponding waveform has the advantage of low out-of-band (OOB) emission, this may satisfy the limitation condition of OOB emission in an LTE system, and, accordingly, the subcarrier deviating from the entire frequency band may also be used. More specifically, the subcarrier of the corresponding part may transmit actual data instead of null data and may also use the CRS.

Embodiment #2: Method for Allocating a Subcarrier Transmitting Null Data Between a Waveform of the Legacy OFDM and a Waveform of the UF-OFDM This corresponds to a method wherein the waveform of the legacy OFDM and the waveform of the UF-OFDM allocate subcarriers transmitting null data that are adjacent to one another and not guard subcarriers that are adjacent to one another. Since the subcarrier transmitting null data does not transmit user data only, even if control data, such as a CRS, are positioned in the adjacent subcarrier, the subcarrier transmitting null data may be allocated. Herein, the adjacent subcarrier may correspond to a subcarrier that is positioned near the waveform of the legacy OFDM or may correspond to a subcarrier that is positioned near the waveform of the UF-OFDM.

Nevertheless, for the performance of channel estimation, it is preferable to not allocate null data to a position where the CRS is located. Accordingly, among the two adjacent waveforms, it is preferable to allocate null data to the subcarrier that is positioned near the waveform where the CRS is not located.

Eventually, step S1120 of FIG. 11 determines a resource allocation method between the waveform of the legacy OFDM and the waveform of the UF-OFDM based on the above-described methods according to the first exemplary embodiment (Embodiment #1) and the second exemplary embodiment (Embodiment #2). In order to perform efficient multiplexing between the legacy OFDM system and the UF-OFDM system, only the method according to the first exemplary embodiment may be applied, or only the method according to the second exemplary embodiment may be applied, or both methods according to the first and second exemplary embodiments may be applied.

In step S1130 of FIG. 11, information on the resource allocation that is determined in step S1120 of FIG. 11 is delivered to a receiving end. More specifically, the receiving end should be notified (or informed) of the information on whether the guard subcarrier is to be allocated or whether the subcarrier transmitting null data is to be allocated and the information on how to arrange the frequency resource. For this, the information on the resource allocation includes 1) index numbers of the allocated resource blocks, 2) a number of shifted subcarriers corresponding to the resource blocks that are allocated due to the number of guard subcarriers, and 3) information on whether or not null data are transmitted from an edge portion of the resource block belonging to the receiving end itself. Herein, information 1) is required for verifying the part where the waveforms are adjacent to one another in case the waveform of the legacy OFDM and the waveform of the UF-OFDM are intermixed for each resource block.

As described in the first exemplary embodiment, in case it is determined to allocate the guard subcarrier, since information on the shifted subcarrier is required to be known, the information on the resource allocation should include information on 1) index numbers of the resource blocks having the waveform of the legacy OFDM and the waveform of the UF-OFDM allocated thereto and information on 2) a number of shifted subcarriers corresponding to the resource blocks that are allocated due to the number of guard subcarriers. The number of shifted subcarriers eventually corresponds to the number of subcarriers of the legacy OFDM or the number of subcarriers of the UF-OFDM that deviate from the entire (or total) frequency band.

As described in the second exemplary embodiment, in case it is determined to allocate the subcarrier transmitting null data, the information on the resource allocation includes information on 1) index numbers of the resource blocks having the waveform of the legacy OFDM and the waveform of the UF-OFDM allocated thereto and information on whether or not null data are transmitted from an edge portion of the resource block belonging to the receiving end itself. The information 3) indicates that null data are to be transmitted from an edge portion of a resource block corresponding to the waveform of the UF-OFDM, in case a CRS is positioned in an adjacent subcarrier between the waveform of the legacy OFDM and the waveform of the UF-OFDM. Additionally, in case a CRS is positioned in an adjacent subcarrier between the waveform of the legacy OFDM and the waveform of the UF-OFDM, and in case an adjacent subcarrier exists near the waveform of the UF-OFDM, the information 3) indicates that null data are to be transmitted from an edge portion of a resource block corresponding to the waveform of the legacy OFDM. In other words, this corresponds to information enabling the subcarrier transmitting null data to be used while preventing loss in the CRS from occurring.

By using this information, the receiving end may perform data detection by referring to the location of its resource block within the entire frequency band and information on whether the guard subcarrier or the subcarrier transmitting null data is being used. The above-described information may be delivered through an additional field of a PDCCH, an enhanced PDCCH (ePDCCH), and so on, which corresponds to a higher layer signal or a physical layer signal.

Figure 17:
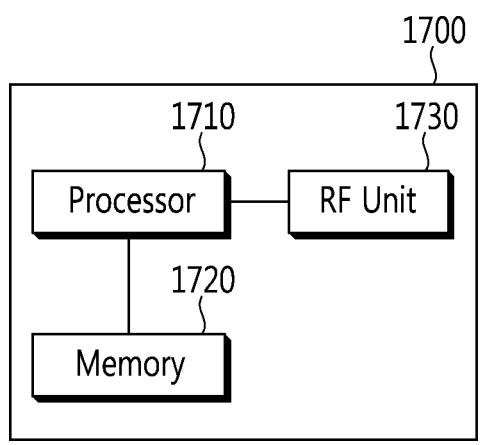
FIG. 17 is a block diagram showing an apparatus for wireless communication for implementing an embodiment of the present invention.

FIG. 17 is a block diagram showing a device for wireless communication for implementing an embodiment of the present invention.

The device 1700 for wireless communication includes a processor 1710, a memory 1720 and a radio frequency (RF) unit 1730.

The processor 1710 may be configured to implement proposed functions, procedures and/or methods described in this description. Layers of the radio interface protocol may be implemented in the processor 1710. The processor 1710 may handle a procedure explained above. The memory 1720 is operatively coupled with the processor 1710, and the RF unit 1730 is operatively coupled with the processor 1710.

The processor 1710 may include application-specific integrated circuit (ASIC), other chipset, logic circuit and/or data processing device. The memory 1720 may include read-only memory (ROM), random access memory (RAM), flash memory, memory card, storage medium and/or other storage device. The RF unit 1730 may include baseband circuitry to process radio frequency signals. When the embodiments are implemented in software, the techniques described herein can be implemented with modules (e.g., procedures, functions, and so on) that perform the functions described herein. The modules can be stored in memory 1720 and executed by processor 1710. The memory 1720 can be implemented within the processor 1710 or external to the processor 1710 in which case those can be communicatively coupled to the processor 1710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for allocating, by a transmitter, frequency resources in a wireless communication system having a first orthogonal frequency division multiplexing (OFDM) system and a second OFDM system multiplexed in a frequency domain, the method comprising:
   determining frequency resource sizes of the first OFDM system and the second OFDM system,
   wherein the first OFDM system includes an inverse discrete Fourier transform (IDFT) block and a Cyclic Prefix (CP) inserting unit being connected to the IDFT block, and
   wherein the second OFDM system includes an IDFT block performing IDFT in frequency resource block units and a filter filtering output signals of the IDFT block in frequency resource block units;
   allocating frequency resources of the first OFDM system and the second OFDM system based on the determined frequency resource sizes,
   wherein a guard subcarrier is allocated to an adjacent subcarrier where the frequency resources of the first and second OFDM systems are adjacent, and
   wherein control data and user data are not transmitted in the guard subcarrier; and
   transmitting information on the frequency resources to a receiver,
   wherein, in case a Cell-specific Reference Signal (CRS) is not positioned in the adjacent subcarrier, the guard subcarrier is allocated to the adjacent subcarrier, and
   wherein, in case a CRS is positioned in the adjacent subcarrier, the guard subcarrier is allocated to a subcarrier that is shifted as much as one subcarrier from the adjacent subcarrier.

2. The method of claim 1, further comprising:
   determining subcarrier indexes of the frequency resources of the first and second OFDM systems.

3. The method of claim 2,
   wherein a subcarrier that deviates from an entire band of the frequency resources of the first and second OFDM systems is generated based on the shifted subcarrier,
   wherein, in case a subcarrier index of the frequency resources of the first OFDM system includes a last subcarrier index of the entire band, no signal of the first OFDM system is transmitted in the deviated subcarrier, and
   wherein, in case a subcarrier index of the frequency resources of the second OFDM system includes a last subcarrier index of the entire band, user data of the second OFDM system is transmitted in the deviated subcarrier.

4. A wireless device for allocating frequency resources in a wireless communication system having a first orthogonal frequency division multiplexing (OFDM) system and a second OFDM system multiplexed in a frequency domain, the wireless device comprising:
  a transceiver configured to transmit and receive radio signals; and
  a processor operatively connected to the transceiver, wherein the processor is configured to:
    determine frequency resource sizes of the first OFDM system and the second OFDM system,
    wherein the first OFDM system includes an inverse discrete Fourier transform (IDFT) block and a Cyclic Prefix (CP) inserting unit being connected to the IDFT block, and
    wherein the second OFDM system includes an IDFT block performing IDFT in frequency resource block units and a filter filtering output signals of the IDFT block in frequency resource block units,
    to allocate frequency resources of the first OFDM system and the second OFDM system based on the determined frequency resource sizes,
  wherein a guard subcarrier is allocated to an adjacent subcarrier where the frequency resources of the first and second OFDM systems are adjacent, and
  wherein control data and user data are not transmitted in the guard subcarrier, and
  transmit information on the frequency resources to a receiver,
  information indicating allocation of any one of the guard subcarrier and the null data wherein, in case a Cell-specific Reference Signal (CRS) is not positioned in the adjacent subcarrier, the guard subcarrier is allocated to the adjacent subcarrier, and
  wherein, in case a CRS is positioned in the adjacent subcarrier, the guard subcarrier is allocated to a subcarrier that is shifted as much as one subcarrier from the adjacent subcarrier.

5. The wireless device of claim 4, wherein the processor is further configured to:
  determine subcarrier indexes of the frequency resources of the first and second OFDM systems.

6. The wireless device of claim 5,
  wherein a subcarrier that deviates from an entire band of the frequency resources of the first and second OFDM systems is generated based on the shifted subcarrier,
  wherein, in case a subcarrier index of the frequency resources of the first OFDM system includes a last subcarrier index of the entire band, no signal of the first OFDM system is transmitted in the deviated subcarrier, and
  wherein, in case a subcarrier index of the frequency resources of the second OFDM system includes a last subcarrier index of the entire band, user data of the second OFDM system is transmitted in the deviated subcarrier.

* * * * *